United States Patent [19]

Rink

[11] Patent Number: 5,029,973
[45] Date of Patent: Jul. 9, 1991

[54] BAYONET CONNECTOR WITH OPTICAL, ELECTRICAL OR FLUID USES

[75] Inventor: Dan L. Rink, Oakland, Calif.

[73] Assignee: Xintec Corporation, Oakland, Calif.

[21] Appl. No.: 584,921

[22] Filed: Sep. 19, 1990

Related U.S. Application Data

[63] Continuation-in-part of Ser. No. 532,884, Jun. 4, 1990.

[51] Int. Cl.$^5$ .................... G02B 6/38; H01R 4/50; F16L 25/00
[52] U.S. Cl. .................... 350/96.21; 350/96.20; 439/335; 439/337; 439/577; 285/396
[58] Field of Search ............ 350/96.20, 96.21, 96.22, 350/96.23; 439/311, 332, 335, 337, 577; 285/396, 402, 397

[56] References Cited

U.S. PATENT DOCUMENTS

| | | | |
|---|---|---|---|
| 4,553,814 | 11/1985 | Bahl et al. | 350/96.21 |
| 4,812,009 | 3/1989 | Carlisle et al. | 350/96.21 |
| 4,880,291 | 11/1989 | Aberson, Jr. et al. | 350/96.21 |
| 4,881,792 | 11/1989 | Alameel et al. | 350/96.20 |
| 4,898,446 | 2/1990 | Hinckley | 350/96.20 |

Primary Examiner—Brian Healy
Attorney, Agent, or Firm—Howard Cohen

[57] ABSTRACT

An improved bayonet connector assembly includes a connector nut having a generally cylindrical tubular configuration with a bore extending axially therethrough. In one embodiment the inner surface of the bore includes at least one camming surface extending both circumferentially and axially therein and disposed to impinge upon the corresponding bayonet pin of the mating bayonet connector. A detent window is formed at the inner end of each camming surface to engage and retain the bayonet pin that is driven slidably along the camming surface into the detent window. The end surfaces of the cylindrical nut are annular and continuous, so that the strength of the structure is maximized. Furthermore, the camming surfaces and the detent slots are arranged so that the entire nut may be formed in a single molding operation. In another embodiment, the camming surfaces and detent recesses are formed on the exterior of the female connector, and the bayonet pins extend radially inwardly in the bore of the bayonet nut.

22 Claims, 3 Drawing Sheets

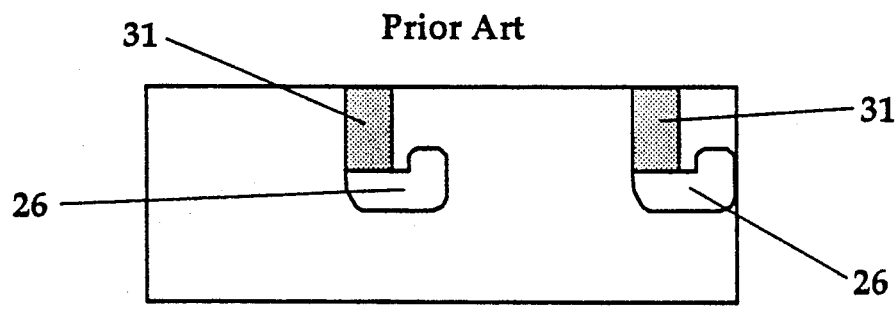
Figure_1
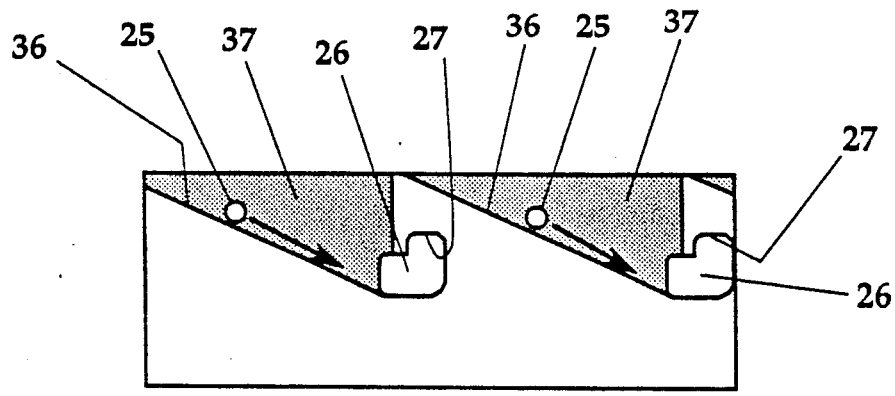
Figure_6
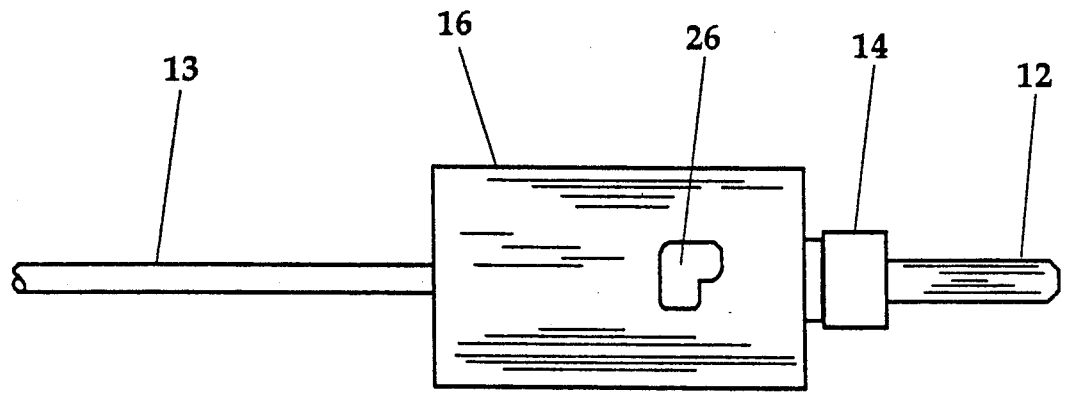
Figure_2

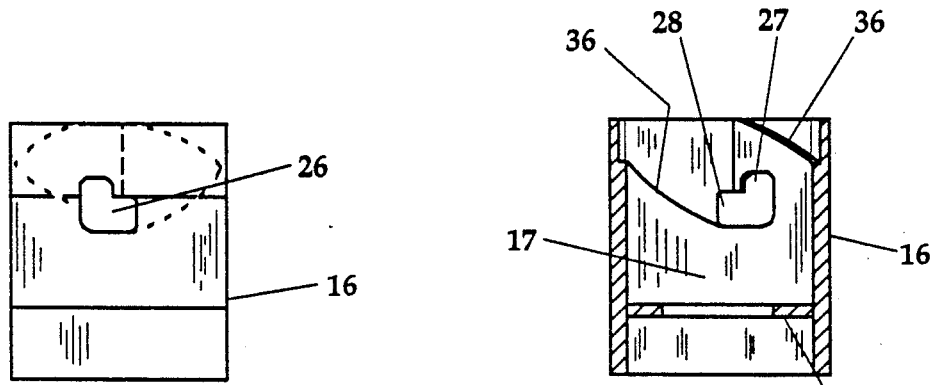
Figure_4  Figure_5
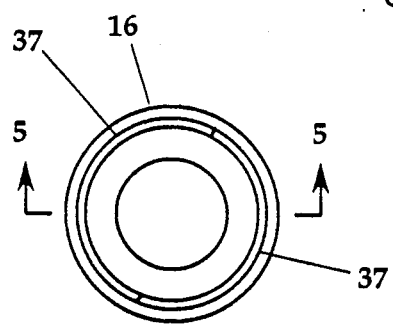
Figure_3
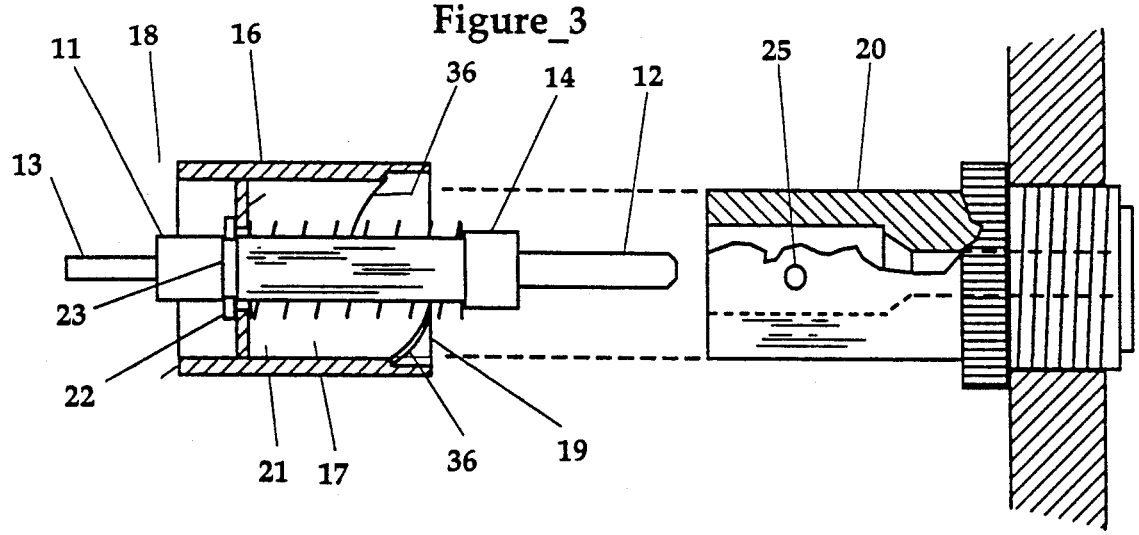
Figure_7

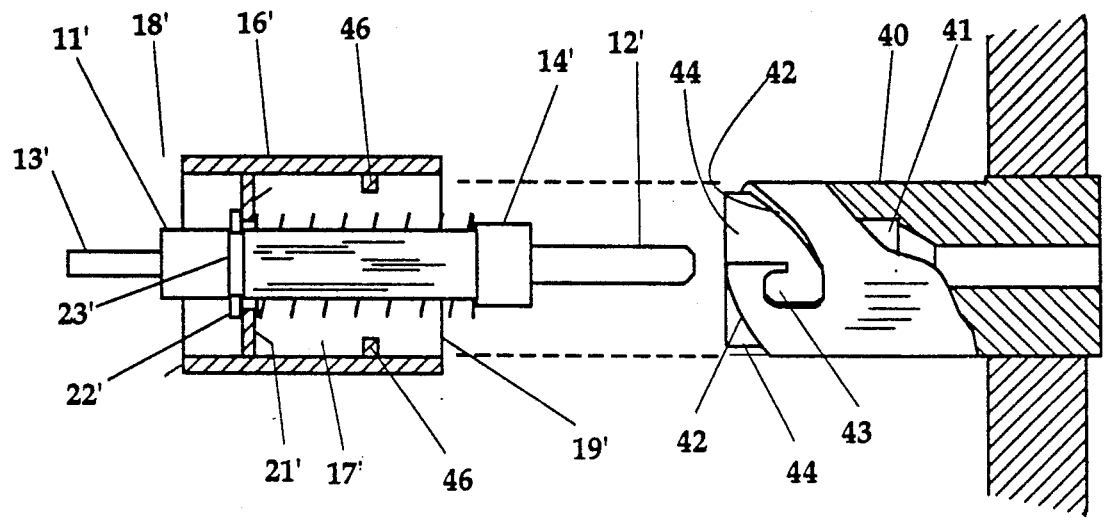
Figure_8
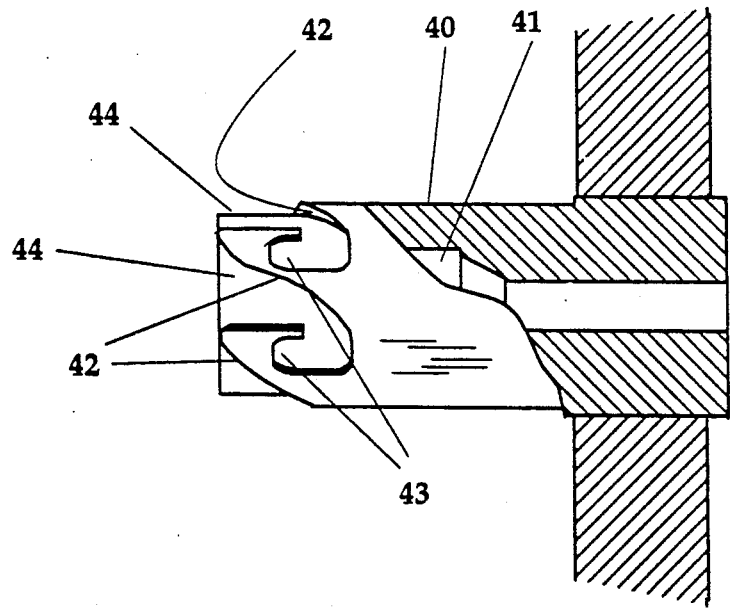
Figure_9

BAYONET CONNECTOR WITH OPTICAL, ELECTRICAL OR FLUID USES

REFERENCE TO RELATED APPLICATION

This application is a continuation-in-part of U.S. patent application Ser. No. 07/532,884, filed June 4, 1990, pending, by Dan Rink, for which priority is claimed.

BACKGROUND OF THE INVENTION

The development of optical fibers for transmission of laser light with low loss has facilitated the widespread application of lasers in communications, industry, and medicine. To couple optical fibers to lasers and laser-powered devices, connectors have been developed which properly orient and position the optical fiber ends for input and output purposes. The connectors have evolved into two major types, threaded connectors and bayonet connectors, which have become standardized. Standardization has permitted the interconnection of lasers, optical fibers, and end-user devices from a wide variety of manufacturers.

Unfortunately, the standardization of optical connectors has had the effect of freezing the development and improvement of optical connectors, and has institutionalized some serious shortcomings in the state of the art. For example, although the standard connectors are much larger than the diameter of the typical optical fiber, they are too small to be grasped and manipulated easily by many individuals. The standard threaded optical connector assembly (SMA type) includes a male connector provided with a small nut adjacent to its distal end, and this nut must be rotated through several complete revolutions to effect a secure connection. However, when the male connector is inserted in the complementary female connector, the nut is typically disposed directly adjacent to a housing or bulkhead wall which supports the female connector, and grasping and rotating the nut is an awkward and difficult task.

The standard bayonet connector assembly (STC type) generally includes an alignment pin extending radially outwardly, requiring the male plug to be closely scrutinized and rotated to effect proper alignment for full insertion of the male plug. Thereafter the bayonet pin(s) of the female connector must be scrutinized and aligned with the bayonet slot(s) of the male connector, and then the male connector must be rotated to engage the bayonet pin(s) and slot(s).

It may be appreciated that both forms of optical connectors require close visualization of the connectors, and a high degree of manual dexterity to effect connection and disconnection. A comparison with electrical connectors is instructive in highlighting the shortcomings of optical connectors. Typical audio connectors such as RCA-type phone plugs permit connection by simple insertion of a male plug ferrule in a female plug receptacle. Electrical power connectors generally include spade lugs that are inserted into receptacles in a female plug. In most cases a casual glimpse and a single motion are sufficient to effect connection or disconnection of audio or power connections. In contrast, prior art optical connectors generally require close and continued visualization, and several intricate manual motions to effect connection or disconnection. Clearly there is a need to improve the design and function of optical connectors.

In the companion parent patent application noted above, there is described an improved bayonet connector assembly in which the slots which receive the bayonet pins are formed to include camming edges extending from the distal edge of the connector nut to the detent portions of the nut. Due to the intrinsic strength requirements of this structure and prior art STC-type bayonet connectors, the nuts are generally formed of die cast or injection molded metal. However, it would be easier and less expensive to fabricate the nut using injection molded plastic material. Injection molded plastic STC-type bayonet nuts have been introduced commercially.

SUMMARY OF THE PRESENT INVENTION

The present invention generally comprises an improved bayonet connector assembly which overcomes many of the drawbacks of prior art optical connectors. The invention includes a bayonet connector nut having a generally cylindrical tubular configuration with a bore extending therethrough. The inner surface of the bore includes at least one camming surface extending circumferentially and axially therein and disposed to impinge upon the corresponding bayonet pin of the mating bayonet connector. A detent slot is formed at the inner end of each camming surface to engage and retain the bayonet pin that is driven slidably along the camming surface into the detent slot.

In one embodiment of the invention, there is provided a pair of camming surfaces formed in the bore of the cylindrical nut, and the detent slots are defined by a pair of diametrically opposed holes in the sidewall of the nut. Each hole comprises a generally L-shaped opening at the inner end of the respective camming surface.

The end surfaces of the cylindrical nut are annular and continuous, so that the strength of the structure is maximized. Furthermore, the camming surfaces and the detent slots are arranged so that the entire nut may be formed in a single molding operation, such as injection molding or the like. Due to the inherent strength of the construction, the nut may be formed of plastic material, thereby saving money in materials and dies. Furthermore, the outer surface of the molded nut may be provided with a diameter and surface configuration that enhance manual grasping of the nut.

BRIEF DESCRIPTION OF THE DRAWING

FIG. 1 is a schematic view showing the interior bore surface of a prior art bayonet connector nut projected on a plane.

FIG. 2 is a plan view of the bayonet connector assembly of the present invention.

FIG. 3 is an end view of the nut portion of the connector assembly of the present invention.

FIG. 4 is a side elevation of the nut portion of the connector assembly of the present invention.

FIG. 5 is a cross-sectional elevation of the nut portion of the connector assembly of the present invention.

FIG. 6 is a schematic view showing the interior bore surface of the bayonet connector nut of the present invention projected on a plane.

FIG. 7 is a partially cutaway exploded view of the bayonet connector of the present invention assembled to a typical prior art female bayonet connector component.

FIG. 8 is a partially cutaway exploded view of a further embodiment of the bayonet connector of the present invention.

FIG. 9 is a partially cutaway side view of another embodiment of the female connector assembly of the present invention.

DESCRIPTION OF THE PREFERRED EMBODIMENT

The present invention generally comprises an improved bayonet connector. A salient feature of the invention is that the structure is adapted to be fabricated by low cost methods, such as molding of a flowable, settable material, such as plastic, resin, polymer, molten metal, or the like.

With regard to FIGS. 2 and 7, the bayonet connector generally includes a tubular cylindrical body member 11 having a ferrule 12 extending from the distal end thereof. In the preferred embodiment the assembly is adapted for use in optical transmission, and an optical fiber 13 is joined to the proximal end of the member 11 and extends to the distal end of the ferrule 12. The ferrule is dimensioned in diameter and length to be received in a female optical bayonet connector 20 and to present the distal end of the optical fiber at the focal point of the connected device, such as a laser light source or the like. An annular boss or flange 14 extends radially outwardly from the distal end of the body member 11 at the junction with the ferrule 12. The components 11–14 are generally common to prior art optical bayonet connectors.

Secured to the body member 11 is a connector nut 16, as shown in greater detail in FIGS. 3-6. The nut 16 is generally configured as a tubular cylinder having a bore 17 extending axially therethrough, and proximal and distal ends 18 and 19, respectively. An internal flange 21 extends radially inwardly in the bore 17 and is disposed between medial and proximal portions of the bore 17. The flange 21 defines a narrow axial opening through which the body member 11 extends with minimal sliding clearance. A C-ring or washer 22 is secured in a shallow annular groove 23 in the body member to position the connector nut 16 on the body member 11. A compression spring 24 is secured about the body member 11, with the opposed ends of the spring impinging on the boss 14 and the internal flange 21 to urge the connector nut 16 against the stop formed by the C-ring 22.

The nut 16 is provided with at least one detent window opening 26 formed in the sidewall thereof. Each detent window is configured with an L-shape, the distal portion 27 of the L-shape comprising a detent dimensioned to capture the bayonet pin 25 of a female optical bayonet connector, the proximal portion 28 of the L-shape comprising an entrance to the detent portion 27. In the preferred embodiment a pair of diametrically opposed detent windows 26 are provided. The components 16–28 are generally common to prior art optical bayonet connectors.

With regard to FIG. 1, a prior art molded connector nut is typically provided with a pair of detent windows 26, and a pair of grooves 31 formed in the bore 17 and extending linearly and axially from the distal end of the connector nut to a conjunction with a respective detent window. The grooves 31 are each dimensioned to permit a bayonet pin 25 of a female optical bayonet connector to slidably translate therealong, so that the nut may be engaged with the female connector and then rotated to retain the engagement by capturing the bayonet pins in the detent portions 27 of the windows 26.

The difficulty in using the prior art arrangement shown in FIG. 1 is that the rather narrow grooves 31 must be aligned with the bayonet pins before the connector assemblies may be engaged, and this alignment is not obvious by visualization. Furthermore, the nut must be rotated carefully and slowly until alignment of the grooves 31 and bayonet pins 25 is attained, the nut must be urged axially to translate the pins 25 fully into the grooves 31, and the nut then rotated in the correct circumferential direction to capture the bayonet pins in the detent portions. These maneuvers are each awkward and tedious, and performing them serially and successfully is a difficult task.

A salient feature of the invention is the provision of at least one camming surface 36 formed in the surface of the bore 17 and extending from the distal end of the connector nut 16 to a detent window 26. Each camming surface 36 is defined by a recess 37 formed in the interior bore 17, the recess 37 having a proximal surface 36 which progresses axially smoothly and continuously from the distal end toward the detent window 26 as it extends angularly in the circumferential direction in the bore. The camming surface 36 may be configured as a toroidal surface section in a helical, hyperboloid, paraboloid, or other similar geometric shape.

The recess 37 is provided with a diameter that is sufficient to pass a bayonet pin 25 in freely translating fashion, whereas the bore 17 is provided with a diameter less that sufficient to pass a bayonet pin. Thus the bayonet pin(s) is constrained to translate only within the recess portion 37, or within the detent window 36. The portion 28 of the detent window 36 is disposed to communicate with the recess 37, so that a bayonet pin may translate from the recess 37 into the area of the detent window. The portion 27 of the window 36 extends directly into the bore 17 itself, and defines therewith a window edge which captures the bayonet pin, due to the fact that the bore diameter is less that the diameter of the bayonet pin.

In the preferred embodiment the nut 16 is provided with a pair of detent windows 16 and a pair of camming surfaces 36. With regard to FIG. 6, it is significant to note that each camming surface originates at the distal end of the nut in general alignment with the termination of the other camming surface. Thus, whenever the nut 16 is urged axially toward a mating connector, both the bayonet pins 25 will impinge upon some portion of the camming surfaces, and the axial force applied manually to the nut will be converted by the camming surfaces into a tangential force which urges the nut to rotate and bring the detent windows into engagement with the bayonet pins. This arrangement is advantageous in that it is not necessary to achieve any initial angular alignment between the bayonet connectors, and that mere axial force on the male connector nut creates a tactile feedback sensation that encourages the user to rotate the nut in the proper direction to complete engagement of the connectors.

Another important advantage of the arrangement of the connector nut 16 shown herein is that it may be formed in one step using prior art molding techniques. A single mold cavity having a plurality of slides extendable therein may be used to fabricate the connector 16 as a unitary object, complete with the camming surfaces and the internal flange 21. This feature permits the connector nut to be fabricated in the least expensive manner, saving significant cost over similar prior art devices. It should also be noted that the connector nut of the present invention provides the camming effect described above while also a continuous distal end edge having no gaps or slots therein. The structure thus has the considerable strength of a tubular cylinder.

To disengage the connector described herein, it is necessary only to grasp the connector nut and urge it axially and distally while applying a slight counterrotating force thereto to permit the bayonet pins to be released from the detent portions 27 of the windows 26. Thereafter, the connector nut and the connector assembly may be withdrawn axially without further rotation.

In a further embodiment of the invention, shown in FIG. 8, components that are similar to components described previously are labeled with like reference numerals having a prime (') designation. The male connector assembly includes a body portion and ferrule 11'-23' substantially as described above. It is significant that the bore 17' of the nut 16' is substantially smooth, with the exception of a pair of bayonet pins 46 extending radially inwardly and disposed in diametrical opposition.

The female connector assembly 40 comprises a tubular member dimensioned to be received within the bore 17' of the nut 16', and a bore 41 configured to receive the ferrule 12', lug 14', and a portion of the body member 11'. The exterior surface of the female connector 40 is provided with inset portions 44 which define at least one camming surface 42 extending from the outer end of the connector to a detent recess 43. The camming surface 42 may be configured as a toroidal surface section in a helical, hyperboloid, parabaloid, or other similar geometric shape.

The diameter of the inset portions 44 is sufficient to permit the pins 46 to pass freely, whereas the diameter of the outer surface of the female connector is greater than the inner extent of the pins 46, so that the pins 46 cannot translate about or along the outside of the female connector.

As the two connectors are urged together, the ferrule 12' is inserted in the bore 41, and the nut 16' is received about the female connector. The pins 46 impinge on some portion of the surfaces 42, and the axial force applied manually to the nut will be converted by the camming surface(s) into a tangential force which urges the nut to rotate and bring the detent(s) 43 into engagement with the bayonet pins. As before, this arrangement is advantageous in that it is not necessary to achieve any initial angular alignment between the bayonet connectors, and that mere axial alignment and axial force on the male connector nut creates a tactile feedback sensation that encourages the user to rotate the nut in the proper direction to complete engagement of the connectors.

The embodiment of FIG. 8 exhibits several advantages over the prior art, and over the other embodiments herein. The camming surfaces and detent portions are formed on the exterior surface, so that machining, molding, or other techniques for forming these features are greatly simplified. Moreover, the female connector is customarily installed in a permanent apparatus, such as a laser light source, whereas the male connector is typically provided on a light delivery system and is often disposable. Due to the fact that the female connector of the embodiment is more expensive to manufacture, and the male connector is much less expensive to fabricate, the male connector is more suitable for disposable products, and there are great cost savings in installing the female connector permanently.

Indeed, it should be noted that the nut of the male connector may be fabricated of tubular metal stock or the like, and the pins 46 may be formed by punching and bending a portion of the nut side wall inwardly.

It should be noted that in any of the embodiments described herein, there may be provided more than a pair of camming surfaces and associated detent portions. As shown in FIG. 9, for example, the female connector of the previous embodiment may be provided with a quartet of camming surfaces and associated detents, comprised of two diametrically opposed pairs. Each camming surface describes the same axial extent as previously indicated, but in a shorter circumferential arc, so that the amount of rotation required to cause a bayonet pin to traverse along a camming surface to engage a detent is approximately halved. Thus the manual effort required to operate the connector is reduced. It should be noted that only one pair of pins 46 is required to engage the female connector embodiment of FIG. 9, although a quartet of pins could be provided.

Although the connector assembly is described herein with regard to use in connection for optical transmission, it should be noted that the structure and mechanism of the invention may also be adapted for use in electrical or fluid connections. For example, the optical fiber secured to the connector assembly could be replaced with an electrical conductor to transmit electrical signals or electrical power, or with a tubular member to carry fluid such as a liquid or a gas.

I claim:

1. In a bayonet connector assembly having male and female plug components, a bayonet nut secured concentrically and rotatably to one of said components and having means to engage at least one bayonet pin extending outwardly from the other of said components, and a bore extending axially in said nut and having an interior bore surface, the improvement comprising detent means disposed within said bore to releasably secure a bayonet pin, and camming surface means disposed in said interior bore surface to engage a bayonet pin and urge the bayonet pin into said detent means as said male and female components are urged together axially.

2. The bayonet connector assembly of claim 1, wherein said camming means includes at least one camming surface extending in said bore surface from a distal end of said nut to said detent means.

3. The bayonet connector assembly of claim 2, wherein said camming surface extends in smooth and continuous fashion in the axial direction and angularly in the circumferential direction in the bore from said distal end of said nut toward said detent means.

4. The bayonet connector assembly of claim 3, further including an inset portion extending into said bore surface, said inset portion having a proximal edge which defines said camming surface.

5. The bayonet connector assembly of claim 4, wherein said inset portion is provided with a diameter sufficient to pass said bayonet pin therethrough, and said bore is provided with a diameter less than sufficient to pass said bayonet pin therethrough.

6. The bayonet connector assembly of claim 5, wherein said inset includes a further edge extending generally axially in said bore.

7. The bayonet connector assembly of claim 6, wherein said detent means includes a detent window extending generally radially from the exterior of said nut to said bore of said nut.

8. The bayonet connector assembly of claim 7, wherein said detent window includes a first portion extending into said bore at a conjunction with said inset portion.

9. The bayonet connector assembly of claim 8, wherein said detent window includes a second portion extending into said bore at a location not in conjunction with said inset portion.

10. The bayonet connector assembly of claim 9, wherein said second portion of said detent window comprises a detent for releasably retaining a bayonet pin.

11. The bayonet connector assembly of claim 10, wherein said connector includes a plurality of said camming surfaces and a like plurality of said detent windows.

12. The bayonet connector assembly of claim 1, further including a connector body member disposed concentrically to said bayonet nut, and a central passage extending axially through said body member.

13. The bayonet connector assembly of claim 12, further including an optical fiber extending through said central passage of said body member to conduct light between said one component to said other component.

14. A bayonet connector assembly having male and female plug components, one of said components having a plurality of bayonet pins extending therefrom, the other of said components having detent means for releasably securing said bayonet pins and camming surface means for directing said bayonet pins into said detent means, said bayonet pins and camming means being engageable by axial proximation of said two components in mating fashion, wherein said male component includes a bayonet nut secured thereto, said bayonet nut having a bore extending axially therein, said plurality of bayonet pins extending radially inwardly in said bore.

15. The bayonet connector assembly of claim 14, wherein said camming means includes at least one camming surface extending about the outer surface of one of said components.

16. The bayonet connector assembly of claim 15, wherein said camming surface is disposed about said female component and extends from an outer mating end of said female connector to said detent means.

17. The bayonet connector assembly of claim 16, wherein said camming surface extends in smooth and continuous fashion in the axial direction and angularly in the circumferential direction from said outer end of said female component toward said detent means.

18. The bayonet connector assembly of claim 17, further including an inset portion extending into said outer surface, said inset portion having a proximal edge which defines said camming surface.

19. The bayonet connector assembly of claim 17, wherein said inset portion is provided with a diameter sufficiently small to pass said bayonet pin thereby, and said outer surface of said female component is provided with a diameter too large to pass said bayonet pin thereby.

20. The bayonet connector assembly of claim 14, further including a connector body member disposed concentrically to said bayonet nut, and a central passage extending axially through said body member.

21. The bayonet connector assembly of claim 20, further including an optical fiber extending through said central passage of said body member to conduct light between said one component to said other component.

22. The bayonet connector assembly of claim 16, wherein said detent means includes a quartet of detent portions, further including a quartet of camming surfaces, each joined to one of said detent portions.

* * * * *